T. R. CRAMPTON.
APPARATUS FOR FEEDING PULVERIZED FUEL TO FURNACES.

No. 111,614. Patented Feb. 7, 1871.

T. R. CRAMPTON.
APPARATUS FOR FEEDING PULVERIZED FUEL TO FURNACES.

Patented Feb. 7, 1871.

T. R. CRAMPTON.
APPARATUS FOR FEEDING PULVERIZED FUEL TO FURNACES.

No. 111,614. Patented Feb. 7, 1871.

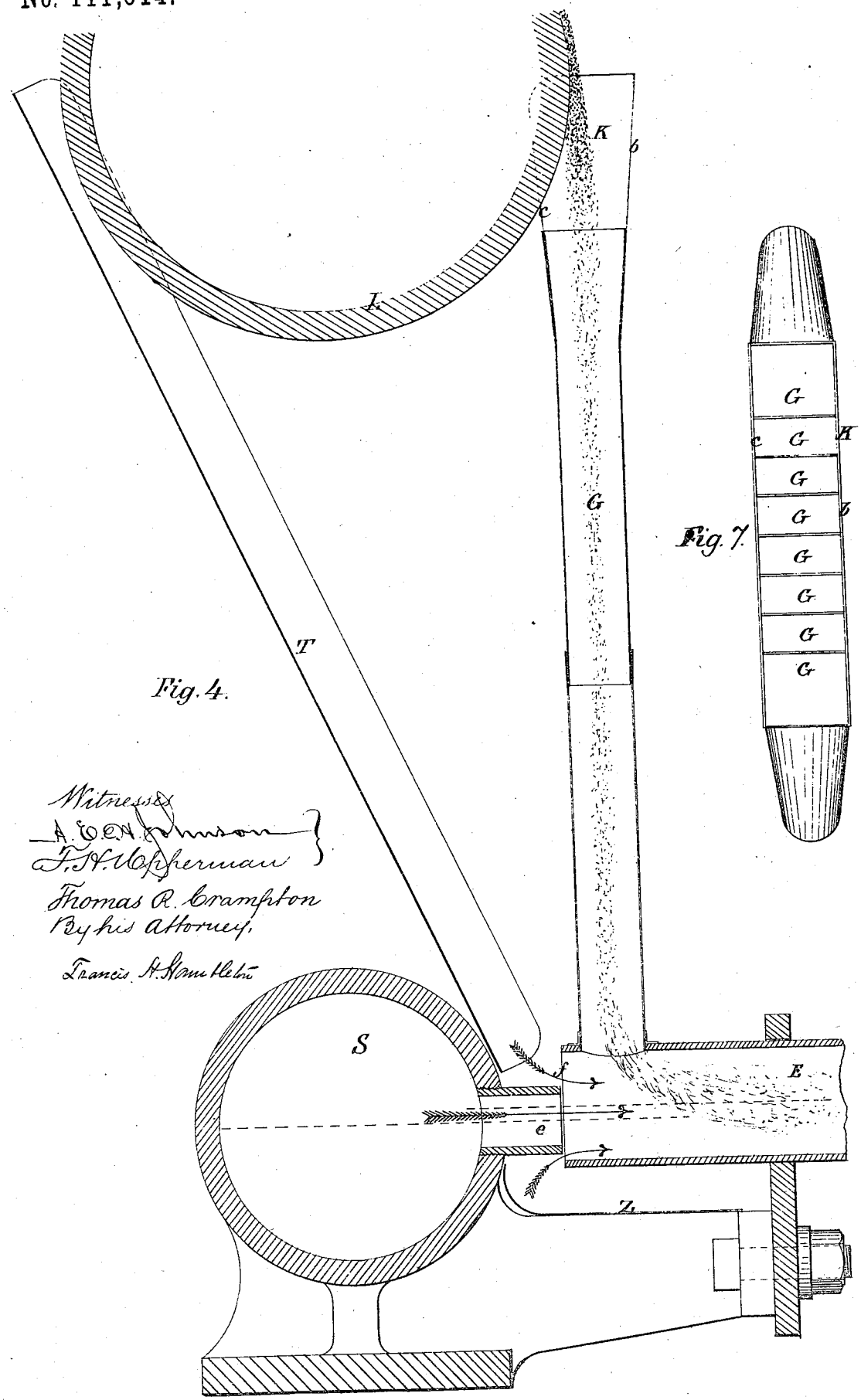

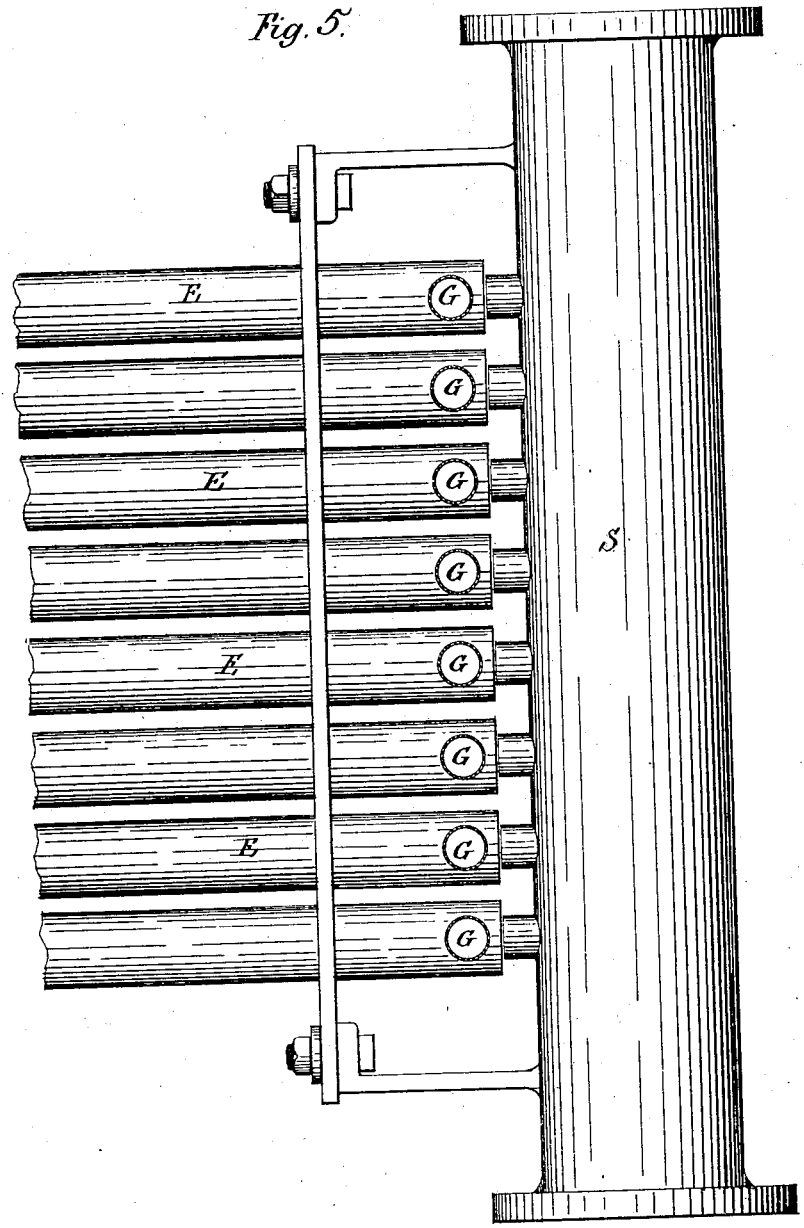

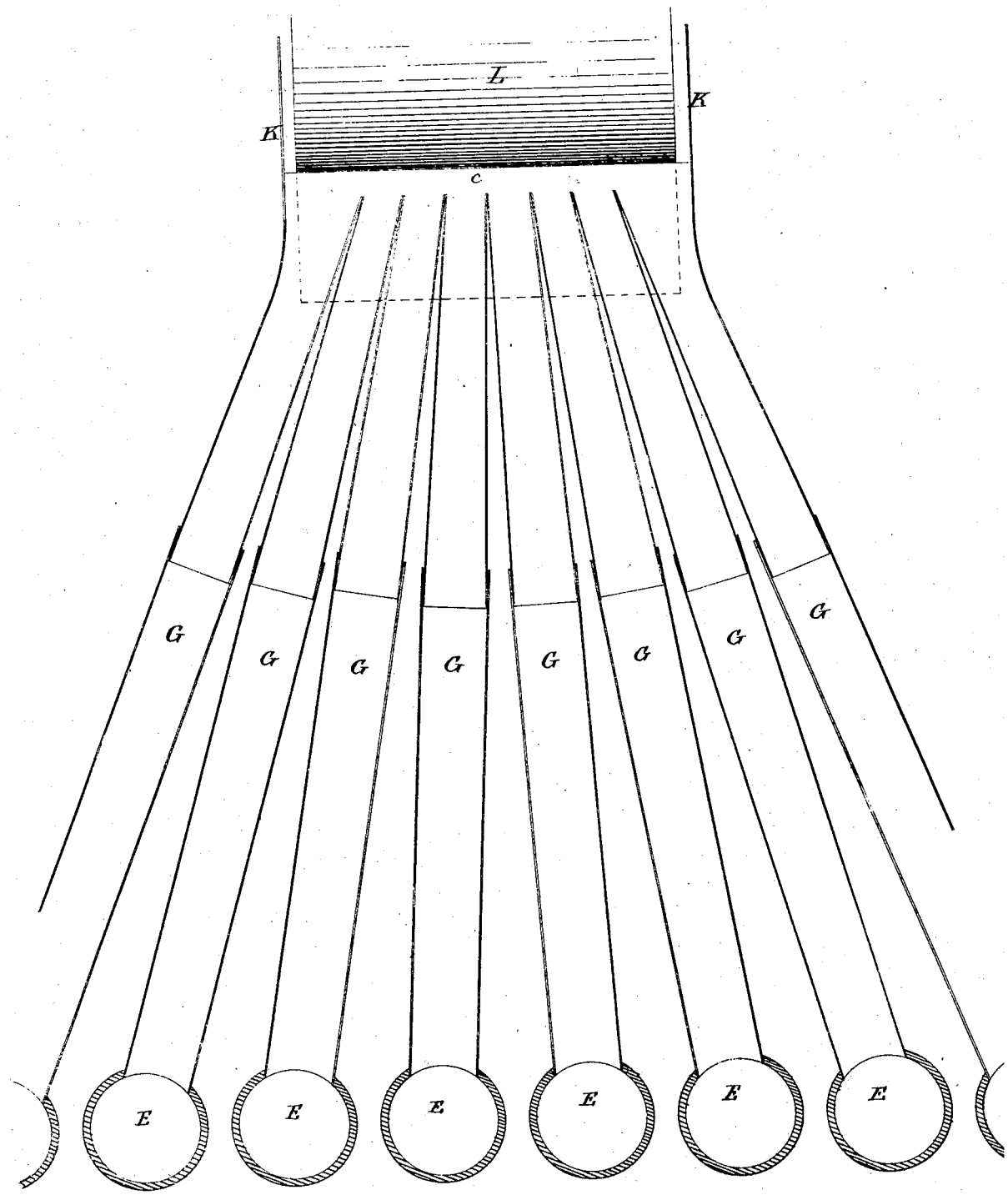

United States Patent Office.

THOMAS RUSSELL CRAMPTON, OF WESTMINSTER, LONDON, GREAT BRITAIN.

Letters Patent No. 111,614, dated February 7, 1871.

IMPROVEMENT IN APPARATUS FOR FEEDING PULVERIZED FUEL TO FURNACES.

The Schedule referred to in these Letters Patent and making part of the same.

*Know all men by these presents:*

That I, THOMAS RUSSELL CRAMPTON, of Westminster, London, in the county of Middlesex, in the Kingdom of Great Britain, have invented certain new and useful Improvements in the method of burning pulverized fuel and in apparatus and furnaces therefor; and I do hereby declare the following to be a full, clear, and exact description, which will enable those skilled in the art to construct and use the same.

I do not pretend to have discovered that a solid fuel, when reduced to powder and combined with a due proportion of atmospheric air, and sufficiently heated at first, and ignited in a proper chamber, may, if the supply is steadily kept up, continue thereafter in combustion.

Others have discovered this before me, and have described various devices for accomplishing the object. Some have used what is called "carbonized air" in the reduction of ores, and for other purposes; some have used it in blast-furnaces; others, again, have described it in connection with devices for producing combustion without reference to its application; some have sprinkled the pulverized fuel on the ore already heated in the ordinary way; others have depended for their results upon converting the solid fuel into an impalpable powder, to which the term "floating" might be applied, and have described the fuel so fine that seventy-five per cent. would pass through a screen of ten thousand holes to the inch, that is, the particles of fine coal are about the one-hundredth part of an inch in diameter, the efficiency of the device depending on this excessive fineness; some have projected this carbonized air through a single pipe into the chamber in which it was to be burned; others have branched the main pipe, making the carbonized air enter the combustion-chamber at different points so as to diffuse the heat over a larger area; one and all, however, seem to have depended either upon the heat from solid fuel, or upon a properly regulated supply of carbonized air, to maintain, independently of solid fuel, a continuous combustion.

The devices for which I now desire Letters Patent belong to the latter class, but are altogether novel, not only in their form and arrangement, but in the principles upon which they operate in producing, regulating, controlling, and directing the desired combustion.

I introduce six or eight, or more or less, according to the size of the furnace, streams of carbonized air at the back of a combustion-chamber, which has a plain solid bottom without fire-bars or divisions of any kind, through openings near to each other and on the same plane, so that the streams of carbonized air as they expand on leaving their respective pipes or openings commingle, insuring a greater uniformity of combination between the air and fuel than can be effected either with a single pipe or with branches from a single pipe opening into the combustion-chamber at places too remote from each other to permit the sufficient commingling of the carbonized streams of air.

And, still further, to promote the perfect combination of fuel with air, I construct the bridge-wall with a suitable slope toward the openings, so that the commingled streams of carbonized air impinging on it at an angle spread in all directions, when there is a further commingling, and a combination of air and fuel homogenous in its character is deflected over the bridge-wall ready to do its work in the furnace to which these devices have been applied.

It will thus be seen that instead of relying upon the combination of air and fuel escaping from a single pipe as sufficiently perfect to secure, when once ignited, a continuous and uniform combustion, I subject the carbonized air as it escapes from each pipe, First, to the action of similar streams from adjacent pipes; and Second, to the impingement upon the bridge-wall, as aforesaid, or even upon the bottom of the combustion-chamber, in order to produce that homogeneity of combination upon which a perfect combustion is altogether dependent.

The use of these devices makes my invention independent of that excessive fineness of pulverization which, it is said, is necessary to the success of some of the other inventions aiming at the same results.

To prepare the fuel used in the devices of Messrs. Whelpley and Storer, various contrivances for pulverizing it have been patented by them, all looking to extreme fineness, while for my devices the products of common millstones suffice.

But it is not only necessary that the commingling which my devices provide for should take place, but that the quantities of carbonized air passing from the several pipes into the combustion-chamber should be, as nearly as practicable, equal.

Accordingly the fuel, ground to the required fineness, is placed in a rectangular reservoir, located above the plane of the pipes aforesaid. In this there are rotating stirrers which urge the fuel through a gate at one end of the reservoir and upon a roller, a part of whose periphery forms the bottom of a box attached to the reservoir and supports the fuel issuing from the gate.

Above the roller, just described, is another and smaller one, a part of whose periphery is within the box; the two rollers by a proper gearing being made to move at about the same surface speed.

The space between the faces of these rollers is adjustable, and receives the pulverized fuel passing through the gate of the reservoir and delivers it in a thin sheet of grains of uniform density into a trough, from which descend as many receiving-tubes as there are conducting-tubes leading to the furnace.

The upper openings of the receiving-tubes in the trough are rectangular, and so closely arranged side by side as to divide equally the sheet of grains falling into them into as many portions as there are conducting-tubes.

The bottom of the receiving-tubes is circular, and they are united each to its separate conducting-tube a little in advance of its outer and open end.

Having thus secured to each conducting-tube an equal supply of fuel, the next thing to be done is to combine or mix it with atmospheric air, and to force the combination, which will then be carbonized air, into the combustion-chamber. This is effected by a fan or other contrivance that may be employed to supply the blast of air required, which is forced into a cylinder in the same plane with the conducting-tubes, opposite to the open ends of which are as many air-nozzles.

These nozzles are smaller in diameter than the open ends of their respective tubes and at a short distance therefrom, so that there is a space into which the external air may enter into the conducting-tubes along with that which is forced into them from the air-nozzles.

From this description, the operation of the devices I have invented, to secure the perfect combustion of pulverized fuel in a combustion-chamber without other aid from solid fuel than may be necessary to heat the chamber at starting only sufficiently to ignite the streams of carbonized air on their first entrance, will be readily understood.

The stirrers in the reservoir of pulverized fuel forward it to the gate, where, passing over a part of the lower roller, it is received between the two, and leaves them in a thin sheet of grains which fall into the receiving-tubes, descend into the conducting-tubes, and then, driven forward by the current of air from the air-nozzles and the external air that enters with it, are carried, commingled with air, to the furnace, entering which the jets of carbonized air commingle by expansion; and being further commingled as they impinge on the slope of the bridge-wall or the solid floor of the combustion-chamber, produce a perfect combustion, applicable to any purpose for which such heat may be required.

Having thus distinguished my devices from all others, and described them generally and their operation, I will proceed now to describe them more in detail, and explain the drawing that exhibits them, to the end that those skilled in the art may be the better enabled to construct and use them.

Figure 4 is a vertical section, showing the relative position of the receiving-tubes, the air-nozzles, and the conducting-tubes.

Figure 5 is a top view of the pressure blast-chamber with its series of nozzles and their relation to the conducting-tubes.

Figure 6 is a vertical section of the receiving-tubes showing their connection with the feed-roller and conducting-tubes.

The same letters represent the same parts in all the figures.

A represents the walls of the furnace.

B, a plain flat bottom in lieu of the ordinary grate-bars.

C the combustion-chamber, heated to the proper temperature to ignite the first jets of carbonized air, as above described, by a temporary fire of wood or other fuel.

Figure 2:
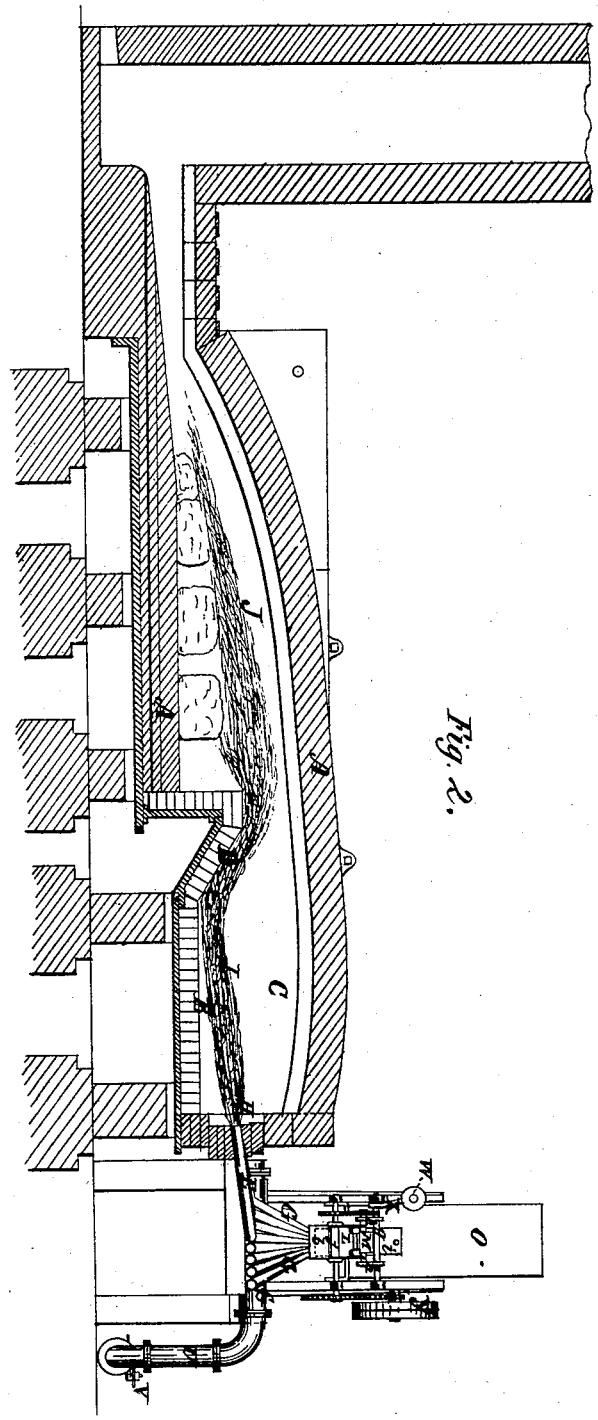
Figure 2 is a front elevation of the feeding and injecting apparatus, and a vertical longitudinal section of the furnace.

D, fig. 2, the fire-bridge, sloped, as described already.

Figure 1:
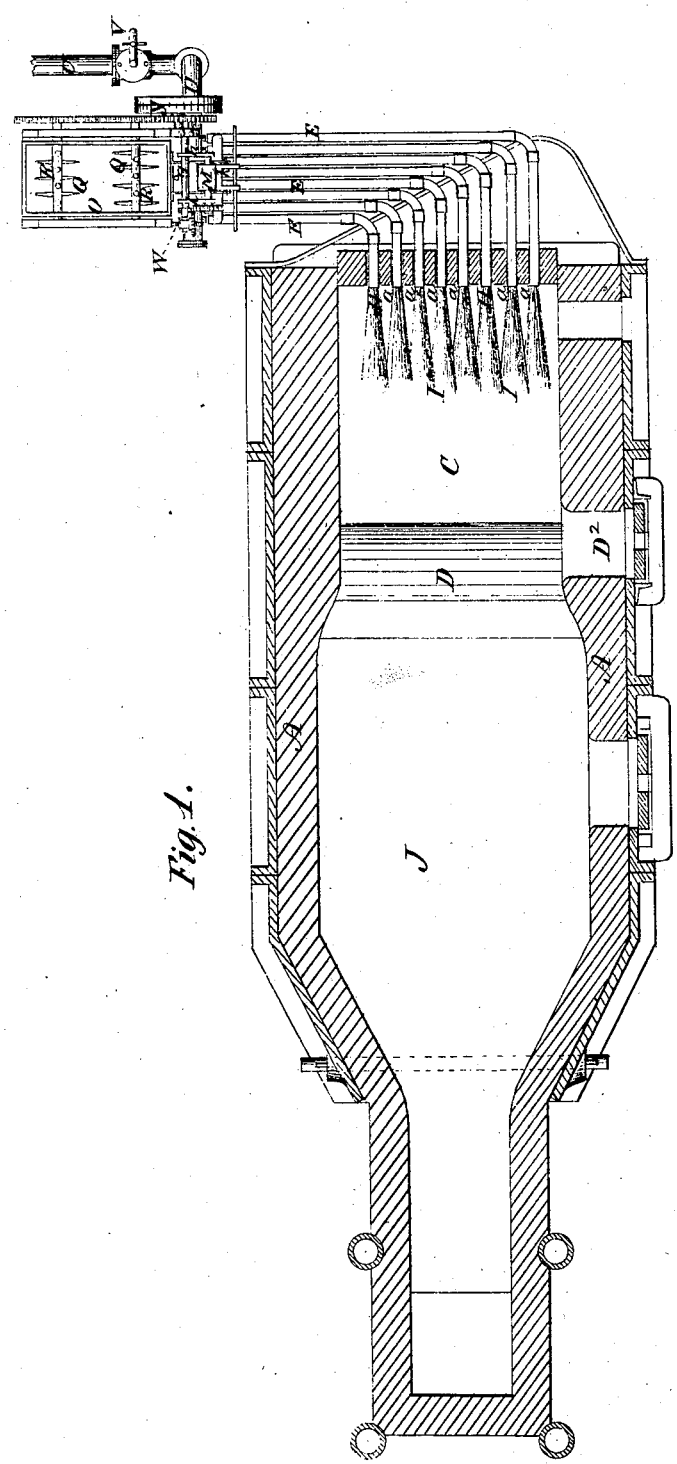
Figure 1 represents a plan of the apparatus for feeding and injecting the pulverized fuel into the combustion-chamber and furnace.

$D^2$, fig. 1, is a door at the end of the bridge, through which slag may be removed and the sloping surface of the bridge-wall protected with any fire-resisting materials, renewed from time to time while the furnace is in operation.

E, the conducting-tubes, inclined, in fig. 2, so that the carbonized air projecting from them may impinge in the direction of the stream I, fig. 2, upon the slope of the bridge-wall.

These tubes, at their entrance into the combustion-chamber, are kept up from the bottom so as to allow a circulation of heated air below them and through the spaces a, fig. 1, between them, counteracting the cooling effect of the incoming streams of carbonized air.

In fig. 1 the conducting-tubes are shown with a bend at right angles, and made in sections, to afford facility in joining them together. This is a convenient form of construction, but not a necessary one. It is convenient because, while the conducting-tubes enter the combustion-chamber at right angles at a proper distance from each other, it allows them to be brought close together under the receiving-tubes without affecting their parallelism, as shown in the drawing, fig. 1.

Nor is their efficiency impaired by this arrangement. The greater specific gravity of the fuel in the carbonized air carries it on the outer interior of the bent tube, and keeping on this side to the mouth, the part of the stream of each tube that is overcharged with fuel is, with the exception of the outermost tube, next the undercharged part of the stream of carbonized air in the adjacent tube, and the undercharged and the overcharged parts being commingled as the streams expand, as already described, the desired homogeneity of combination is promoted, to be perfected as the combined streams impinge on the bridge-wall or solid floor of the chamber, as aforesaid.

The arrangement shown in fig. 1 has this recommendation, that it permits the reservoir and its attachments to be placed aside and out of the way. The device, however, is independent of this. I have found that, practically, an inside diameter of two inches for the conducting tubes, and placing them from five to five and one-half inches apart, measuring from center to center, where they enter the combustion-chamber, gives excellent results. Their ends may be protected by ordinary water tuyeres, or made flush with the outside of the combustion-chamber or a small recess from it, as shown in fig. 2, and luted with fire-clay.

I have mentioned the distance of five to five and one-half inches from center to center of the conducting tubes; but a lesser or even a greater distance may answer a good purpose, having regard to the length and depth of the combustion-chamber, velocity and bulk of the streams of carbonized air, and other circumstances; but they must never be placed so far apart that the respective streams will not commingle, as herein described, on their escape from the conducting-tubes.

For the purpose of equalizing the heat on both sides of the furnace the conducting-tubes may be arranged to enter nearer the side in which the doors are in the furnace, as shown in fig. 1, thereby dispensing with the monkey at the bridge, heretofore used for that purpose; or the tubes may be central and directed slightly toward the door side to effect the object.

G represents the receiving tubes, into which the carbon falls from between the rollers L and M, as already described. They are drawn together at their upper ends, which shortens the rollers L and M, and has other advantages in securing more uniformity in the amount of fuel fed into the receiving-tubes.

b and c, fig. 4, represent the sides of what I call the trough in the foregoing description, into which the fuel falls, and in whose bottom are the openings of the receiving-tubes. The side c touches the lower roller.

L and M are the feeding-rollers, the upper periphery of L being a little above the bottom of the reservoir O, which projects, as shown at P, of the width of the rollers, so as to form a box, into which the stirrers Q Q forward the fuel through the opening d against the upper roller M, between which and L it passes in a constant and uniform stream, as already described.

To facilitate this, and to facilitate the inspection of the condition of the carbon in the box P, the axis of M, as shown in the drawing, is in advance of the axis of L.

The quantity of fuel passing between these rollers is regulated, by varying the distance between them, by means of a regulating-screw, W, acting on a lever, X, so as to turn a shaft, g, which carries the bearing-arms of the upper roller.

The feed of the rollers may be regulated in many ways; I prefer that which I have particularly described.

Figure 3:
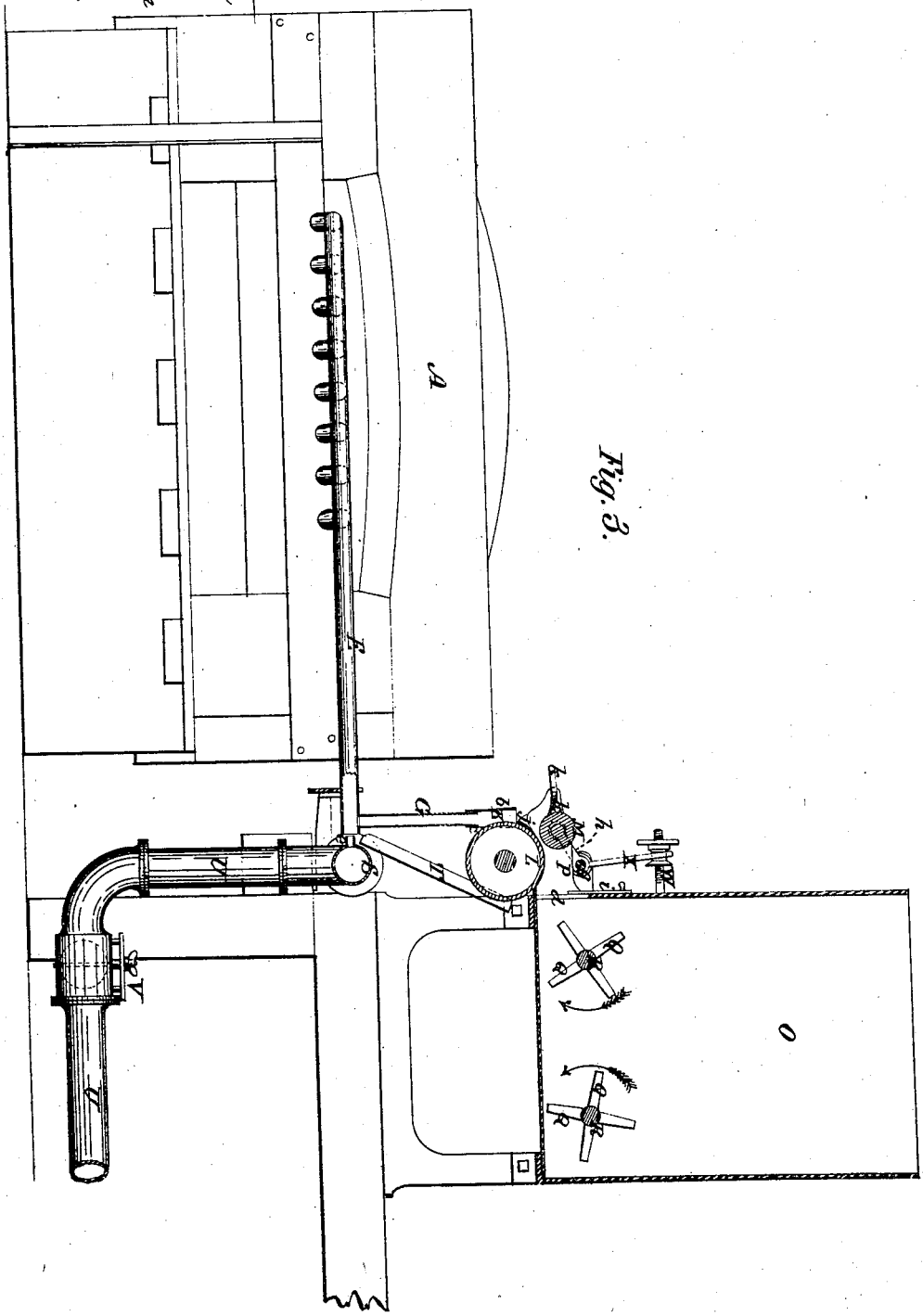
Figure 3 is an end elevation of the furnace and a section of the feeding and injecting apparatus.

The lower roller L is provided with a thin scraper, j, fig. 3, fixed in the box P, adjusted to scrape the carbon as it passes out from the roller.

The upper roller has a scraper, k, also, hinged to the box P, and with a counterbalance, so as to rest against the roller and detach any particles of fuel that may adhere to and be carried up by it.

Q, fig. 3, represents the stirrers in the reservoir O. They are formed by placing suitably-shaped arms on horizontal shafts, and rotated by a belt on the pulley Y, or by any ordinary contrivance.

They force the pulverized fuel through the opening d, fig. 3, regulated by a door, i, the top of the opening d being kept below the top of the box P, so that the fuel passing out is not forced over the top of the box.

Should the box P become filled with fuel in consequence of the rollers not taking it away fast enough, the stirrers, not having sufficient force to increase the height of the fuel in the box, will continue to agitate it till the rollers have reduced the quantity in the box, when it is replenished by the action of the stirrers.

The fuel in the box is always, in this way, in a comparatively loose state, and at a comparatively uniform pressure, whatever may be the height of the fuel in the reservoir.

e e e e are the air-nozzles, with their open ends about one-fourth of an inch from the open ends of the conducting-tubes, and their centers about one-fourth of an inch below the centers of the latter.

This arrangement, with the position of the receiving-tubes near the end of the conducting ones, causes the air drawn from without into them, along with that supplied from the nozzles, to carry the descending fuel into the conducting tubes better and more surely than if the nozzles were central with them, and obviates any tendency of the current of air to ascend the receiving-tubes.

It gives also much more time for the descending fuel to be turned into the conducting-tubes; prevents any collection of fuel on their bottom; and the increase of the area of the opening above the nozzles facilitates the draught into the conducting-tubes of any particles of fuel which may have not passed between the rollers and fallen down.

It will be seen on inspection that the nozzles e e e e are smaller in diameter than the conducting-tubes, which is what allows the outer air to be drawn in by induction through the space between the two.

S is the air-chamber, supplied from a blast-fan, the velocity of the air being regulated by the valve V in the air-pipe U.

A collecting-plate, Z, fig. 4, may be arranged directly below the air-nozzles, to catch any fuel that may not be drawn into the conducting-pipes.

In working furnaces having a partial vacuum there should be sufficient force in the streams of carbonized air to enter the furnace freely when the vacuum is reduced by opening the door or otherwise, to prevent the carbon being retained in the conducting-pipes, especially when they are of some length and have bends in them, and also to prevent the fuel from blowing back in cases where it is fed into the tubes close to the furnace or otherwise.

I have found that in an ordinary heating-furnace, worked with an ordinary vacuum in the chimney equal to about one-fourth of an inch of water, when the air without the fuel is forced, at one-half inch pressure, into a cold furnace, the pressure is sufficient to carry in the fuel when the doors are open during the ordinary working when at full heat.

In proportioning the conducting-pipes, therefore, reference should be had to the pressure indicated. The importance of this point will be understood by all acquainted with the working of furnaces.

If the furnace is to be worked under a pressure of a few inches of water, or just on a balance with the outer atmosphere, the pressure of the streams of carbonized air must be increased or diminished according to the pressure used in the furnace.

Furnaces having grate-bars for fixed fuel may be changed into those having plain combustion-chambers by covering the fire-bars with a suitable refractory material, or a plain bottom may be substituted for the fire-bars after they are removed.

I do not claim injecting pulverized fuel into the combustion-chamber of a furnace by means of a blast of air, gas, or steam passing through one or more tubes, as that has been done; but What I do claim as my invention is—

1. The series of conducting-tubes arranged on the same horizontal level, and grouped substantially as set forth.

2. In combination with the above, combining, as an additional element, a solid floor without fire-bars, on which the streams from the tubes may impinge or not, as desired.

3. In combination with the subject matter of the first clause as above, combining as an additional element a sloping bridge-wall, as hereinbefore described, with a view, by the impingement thereon of the carbonized air from the tubes, to promote the greater homogeneity of the combination of the fuel and air entering the combustion-chamber from the tubes aforesaid, as they impinge upon it and are deflected upward into the chamber beyond.

4. The combination of the stirrers Q in the reservoir O, the opening d, the box P, and the rollers L and M for delivering a sheet of pulverized fuel in equal quantities into the trough, whose bottom is the open mouths of the receiving-tubes G, arranged as above described.

5. The combination, as additional elements to the last clause of claim, of the air-nozzles from the air-chamber S, the receiving-tubes and the conducting-tubes, the center line of the nozzles being below the center line of the conducting-tubes, as described.

6. The division of a given quantity of pulverized fuel into equal parts by passing it between adjustable rollers into a trough whose bottom is the open rectangular mouths of the tubes requiring to be equally supplied with fuel, in the manner herein described.

7. The arrangement of the rollers L and M relatively to the discharge-opening d in the hopper, so as to form a limited supply-chamber between them, as hereinbefore described.

8. The arrangement of the receiving-tubes side by side, when the sheet of pulverized fuel falls into them, thereby diminishing the length of the rollers, and in that manner avoiding too great an attenuation of the shee of fuel passing through them.

T R. CRAMPTON.

Witnesses:
T. HILLAS CRAMPTON,
   12 *Great George-street, Westminster.*
THOMAS LLOYD,
   12 *Great George-street*, Westminster, London